United States Patent
Munby

[15] 3,690,096
[45] Sept. 12, 1972

[54] IGNITER ARRANGEMENT FOR A GAS TURBINE ENGINE

[72] Inventor: Harry Munby, 5 Watt Street, Burnley, Lancashire, England

[22] Filed: Dec. 31, 1970

[21] Appl. No.: 103,130

[52] U.S. Cl. ................................60/39.82 P
[51] Int. Cl. ....................................F02k 3/10
[58] Field of Search.....60/39.82 P, 39.82 S, 39.82 R, 60/39.74 R, 39.64

[56] References Cited

UNITED STATES PATENTS

| | | | |
|---|---|---|---|
| 2,832,402 | 4/1958 | Jurisich | 60/39.82 P |
| 2,930,192 | 3/1960 | Johnson | 60/39.74 R |
| 3,007,312 | 11/1961 | Shutts | 60/39.82 R |
| 3,124,933 | 3/1964 | Stram et al. | 60/39.82 P |

*Primary Examiner*—Carlton R. Croyle
*Assistant Examiner*—Warren Olsen
*Attorney*—Holman & Stern

[57] ABSTRACT

An igniter arrangement for a gas turbine engine combustion chamber has a nozzle adapted to direct a fine jet of fuel into the chamber through a port, the nozzle being spaced from the outside of the chamber wall. Air also enters the chamber through the port and the mixture is directed by a baffle towards an igniter plug in the chamber wall. In the absence of a fuel jet from the nozzle the air flow through the port serves to cool the igniter plug.

3 Claims, 1 Drawing Figure

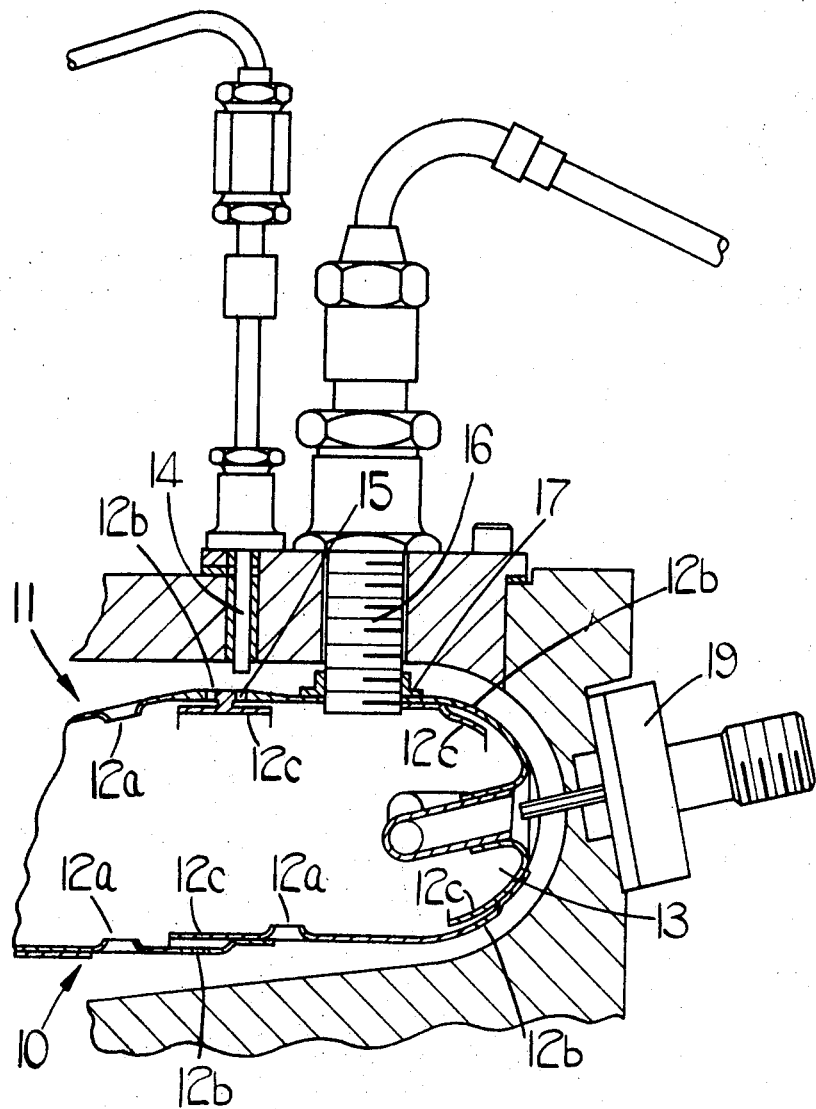

IGNITER ARRANGEMENT FOR A GAS TURBINE ENGINE

This invention relates to an igniter arrangement for a combustion chamber of a gas turbine engine, the said chamber being of known type in which air from the compressor is arranged to flow externally of the chamber and to enter the chamber through holes in the walls thereof, some of the holes having associated baffles so as to provide, adjacent the internal faces of the said walls, a layer of relatively cool air and in which the igniter arrangement includes an electrical igniter plug and an associated fuel supply means, both of which are directed towards the combustion chamber.

Known igniter arrangements for combustion chambers of the above type have a number of disadvantages, including the features that they introduce a substantial obstruction in the external airflow and also that the internal layer of cool air is reduced or absent in the vicinity of the igniter arrangement.

According to the present invention, there is provided a gas turbine engine having a combustion chamber, an air supply passage mounted externally of the combustion chamber, walls of the combustion chamber being provided with a plurality of holes therethrough to allow air from the air passage to enter the combustion chamber, baffles associated with some of the holes to provide a layer of relatively cool air adjacent the internal faces of the walls, fuel supply means for supplying fuel into the combustion chamber, and an electrical igniter plug opening into the chamber, and sealingly engaged with a wall thereof, wherein one of the holes with associated baffles constitutes a port and the fuel supply means opens into the air passage in alignment with the port and is adapted to produce a fine jet of fuel which, in use, enters the combustion chamber through a port together with part of the air from the air passage to be deflected by the associated baffle towards the igniter plug.

An embodiment of the invention will now be described by way of example and with reference to the accompanying drawing which shows somewhat diagrammatically a part section through a combustion chamber and an associated ignition arrangement.

A combustion chamber 10 is of annular form and is supplied with air from a compressor (not shown) via a passage 11, from which the air enters the chamber 10 via holes 12a, 12b. Holes 12b have associated baffles 12c which direct air entering the holes 12b along the inner wall of the chamber 10. Air also enters the chamber 10 adjacent the main burners 19 at an end 13 of the chamber 10. A supply nozzle 14 for igniter fuel is adapted to produce a fine jet. The nozzle 14 is substantially clear of the passage 11 and is directed towards a port 15 provided by enlarging one of the holes 12b.

An electric igniter plug 16 opens into the chamber 10 and is sealingly engaged with the wall thereof by means of a gromet 17 which is slidable on the plug 16 to permit radial expansion of the chamber 10.

In use, the skirt 12c associated with the port 15 acts as a baffle to deflect air from the passage 11 and igniter fuel from the nozzle 14 towards the end of the plug 16, where the said fuel is ignited. When the engine is running but fuel is not being supplied from the nozzle 14, air from the passage 11 enters the port 15 and is directed across the end of the plug 16 to maintain adequate cooling in this area. The life of the plug 16 is thus extended.

The introduction of the igniter fuel to the chamber 10 by means of a jet has the result that obstruction of the passage 11 is reduced to that caused by the plug 16. Moreover the size of the grommet 17 is reduced to that required to seal the plug 16 only.

The nozzle 14, being in the passage 11, is not exposed to the flame in the chamber 10. Deterioration and fouling of the nozzle 14 are thereby substantially reduced.

Having thus described my invention what I claim as new and desire to secure by Letters patent is:

1. A gas turbine engine having a combustion chamber, an air supply passage mounted externally of the combustion chamber, walls of the combustion chamber being provided with a plurality of holes therethrough to allow air from the air passage to enter the combustion chamber, baffles associated with some of the holes to provide a layer of relatively cool air adjacent the internal faces of the walls, fuel supply means for supplying fuel into the combustion chamber, an electrical igniter plug opening into the chamber, and sealingly engaged with the wall thereof, wherein one of the holes with associated baffles constitutes a port and the fuel supply means opens into the air passage in alignment with the port and is adapted to produce a fine jet of fuel which, in use, enters the combustion chamber through the port together with part of the air from the air passage to be deflected by the associated baffle toward the igniter plug.

2. A gas turbine engine as claimed in claim 1 in which the fuel supply means is a nozzle which is located substantially clear of the external air flow in the air supply passage.

3. A gas turbine engine as claimed in claim 1 which includes a grommet secured to the wall of the chamber in which grommet the igniter plug is sealingly slidable.

* * * * *

UNITED STATES PATENT OFFICE
CERTIFICATE OF CORRECTION

Patent No. 3,690,096　　　　　　　　　　Dated September 12, 1972

Inventor(s) Harry Munby

It is certified that error appears in the above-identified patent and that said Letters Patent are hereby corrected as shown below:

[73]　Assignee:　Joseph Lucas (Industries) Limited
　　　　　　　　　Birmingham, England

Signed and sealed this 13th day of February 1973.

(SEAL)
Attest:

EDWARD M. FLETCHER, JR.　　　　　　　　ROBERT GOTTSCHALK
Attesting Officer　　　　　　　　　　　Commissioner of Patents